May 2, 1967
J. E. McCLAIN
3,317,741
ELECTRICAL SWITCHING SYSTEM
Filed Nov. 1, 1963
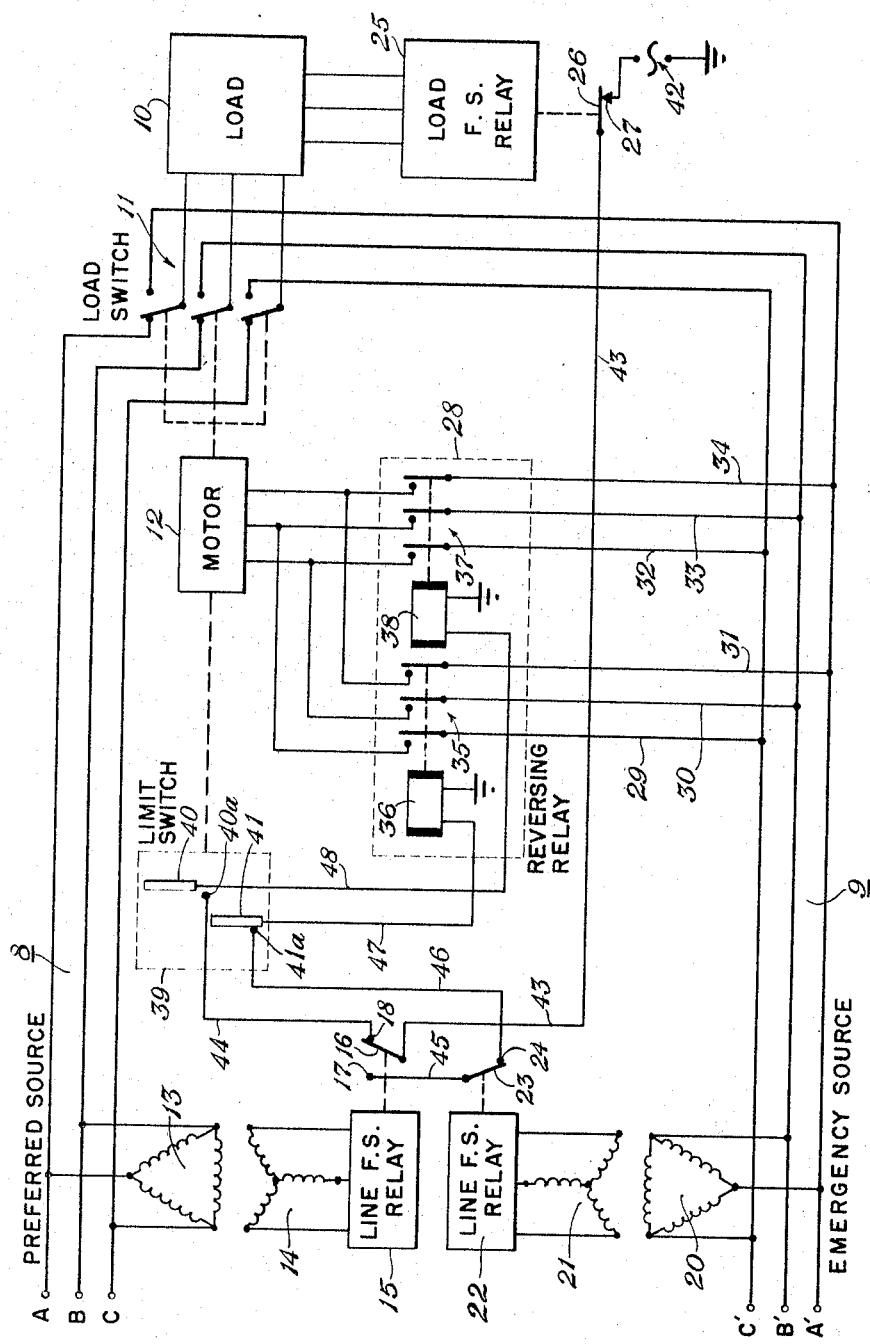
INVENTOR.
James E. McClain
BY
Wm. T. Wofford
Attorney

United States Patent Office 3,317,741
Patented May 2, 1967

3,317,741
ELECTRICAL SWITCHING SYSTEM
James E. McClain, 1001 Park St.,
Greenville, Tex. 75401
Filed Nov. 1, 1963, Ser. No. 320,878
6 Claims. (Cl. 307—64)

This invention relates to an automatic switching system for electrical power lines and more particularly to an arrangement for substituting an emergency source for the preferred source of electricity under certain conditions.

It has heretofore been proposed to provide an automatic switching system which is designed to connect the load of a transmission line to an emergency source of electricity in the event of failure of the preferred source which is normally connected to the load. Such systems are not entirely satisfactory, however. Some are extremely complicated. Others do not take into account the fact that the emergency source may be faulty, as well as the preferred source, in which event, it would accomplish nothing to substitute one for the other. Again, it may be that there is a fault in the load circuits, with the result that the difficulty will not be cured by switching from one source to another.

In accordance with the present invention, it is proposed to provide a very simple relay control system for accomplishing certain specific functions, namely, to switch a load circuit automatically from a preferred source in a transmission line to an emergency source, when a fault occurs in the preferred source, provided there is no fault in the emergency source. Secondly, it is proposed to provide a system which will automatically switch back to the preferred source when the fault therein is cured. In the third place, it is proposed to provide a system which will not do any switching, whatsoever, if there is a fault in the load circuit.

From the above, and from the detailed description hereinafter, it will be understood that the present invention is not directed broadly to a system which will disconnect a generator when it is overloaded, nor to a system where a booster generator is added into a transmission line, nor, broadly, to a system for substituting one generator for another without first determining if the second is in proper condition to meet the demand which is to be put upon it by the load circuit; and it is not a system which will perform a switching operation merely responsive to a fault in the load circuit. The novelty in the present arrangement resides in providing the precautionary measures mentioned above before any switching takes place.

Accordingly, the main object of the invention is to provide a simple and effective, and automatically operating switching system for substituting one power source for another in a transmission line, if, and only if the substitute source is in condition to take the load.

Another object is to provide a simple and effective, and automatic system for substituting one power source for another in a transmission line, if, and only if there is not a fault in the load circuit.

Other objects and advantages reside in the arrangement of the various elements of the power transmission system as will be apparent from the following detailed description of the preferred embodiment of the invention, when considered in connection with the accompanying drawing, in which:

The single figure is a schematic circuit diagram of an electrical power transmission system having a preferred source, an emergency source and a load circuit, with a control system arranged in accordance with the present invention associated therewith.

Referring to the drawing in detail, it will be seen that a three-phase transmission system is illustrated. The "Preferred Source" 8 is so designated and the three bus bars thereof are marked A, B, and C.

Likewise, there is an "Emergency Source" 9, and it has three bus bars marked A', B', and C'.

There is a load circuit 10, designated "Load," and there is a main switch 11, designated "Load Switch," which is a three pole, double throw device, so that either the bars A, B, and C of the preferred source, or the bars A', B', and C' of the emergency source may be connected to the load 10, but both sources cannot be connected to the load at the same time. The load switch 11 may be an "oil switch," inasmuch as it may carry a large amount of current.

The load switch 11 is moved from one position to the other by means of an electric motor 12. The motor 12 is shown as mechanically connected to the load switch 11 by the dash line. As will be explained hereinafter, the motor is reversible and is provided with limit switches so that it moves the blades of the load switch only from one position to the other, and after accomplishing this function, the motor is deenergized, so that it comes to rest until again energized for moving the blades to the other position.

The system of the present invention consists in an arrangement for controlling the energizing of the motor 12 under certain prescribed conditions.

Connected to the bars A, B, and C of the preferred source 8 is the primary 13 of a transformer. As illustrated this primary has its coils delta-connected.

The secondary 14 of this transformer has its coils Y-connected.

The secondary 14 is connected to a line fault sensing relay 15, designated "Line F.S. Relay" on the drawing. This may be a Westinghouse "C.P. Type" relay, or other suitable device for responding to faults in the preferred line 8, which are transmitted to it, through the transformer 13–14.

The relay 15 has a blade 16 with one front contact 17 and one back contact 18. The blade 16 is normally in engagement with the back contact 18, as shown. Under normal conditions in the line 8, the blade 16 is not moved by the relay 15. When a fault occurs in line 8, the relay 15 responds and moves the blade 16 to the front contact 17.

Likewise, the bars A', B', and C' of the emergency source 9 are connected to the primary 20 of a transformer which has a secondary 21, and this transformer is the same as the transformer 13–14. The secondary 21 is connected to a line fault sensing relay 22, which may be the same as the relay 15.

It will be observed, however, that the blade 23 of the relay 22 has only a back contact 24. It does not have a front contact corresponding to the contact 17 of the relay 15. The blade 23 is normally in engagement with its contact 24 and remains in that position unless moved by the relay 22.

The relay 22 responds to a fault in the emergency source 9, but does not move the blade 23 unless there is a fault in the source 9.

The system also includes a load fault sensing relay 25, designated "Load F.S. Relay." It is connected to the load circuit 10, as illustrated, and controls a blade 26 having a contact 27. The blade 26 is normally in engagement with the contact 27 and remains in that position unless there is some fault in the load circuit 10. If a fault occurs in the load circuit 10, the relay 25 moves the blade 26 off of its contact 27 and breaks the circuit at that point.

Under the control of the fault sensing relays 15, 22, and 25, either singly or collectively, there is a reversing relay 28 for the motor 12. This reversing relay 28 is shown connected to the emergency source 9, for its power, by lines 29, 30, and 31 on one side, and lines 32, 33, and 34 on the other side. It could, of course, be connected to some other source for its power.

The lines 29 to 34 inclusive are connected to the motor 12, as illustrated, lines 29, 30, and 31, having a three-pole, single-throw switch 35 therein, which is actuated by a relay coil 36; and the lines 32, 33, and 34, having a similar three-pole, single-throw switch 37 actuated by a relay coil 38. Both switches 35 and 37 are normally open.

The coils 36 and 38 are energized only in the alternative. When one or the other of the coils 36 or 38 is energized, it closes its switch and causes the motor to rotate either clockwise or counterclockwise, depending upon which coil is energized, and this throws the load switch 11 one way or the other.

When the motor 12 has moved the blades of the load switch 11 to one position or the other, the limit switch 39 breaks the circuit to the relay coil 36 or 38, whichever one is energized, and the motor 12 comes to a halt and remains stationary until it is called upon to reverse its rotation and again actuate the switch 11.

The limit switch 39 is shown as a conventional drum type control with two metallic strips 40 and 41 thereon, each having a wiper or brush. In the position shown the wiper 40a for the strip 40 is just out of engagement. The wiper 41a for the strip 41 is in engagement. If the strips move downwardly with respect to the wipers, eventually the wiper for strip 41 will move out of engagement, being then above the strip 41, but the wiper for strip 40 will then be in engagement.

The limit switch 39 is shown as mechanically actuated by the motor 12 by the dash line. Of course, this mechanical connection could be a gear train, and any other known type of limit switch could be used instead of the drum type indicated, various limit switches being old and well known in the art, and, per se, forming no part of the present invention.

In addition to the preferred source 8 and the emergency source 9, one additional source is shown at 42 on the drawing. This is the source used to actuate the relays of the control circuit. Of course, it could by any suitable source of electricity. For example, the bars B' and C' might be used as the supply, with or without the use of a transformer. For simplicity of illustration, an entirely independent supply has been indicated, however.

In the arrangement illustrated in the drawing, all of the switches are shown in the position they take when the situation is normal, i.e., when there is no fault in the preferred line 8 and no fault in the load circuit 10. The load switch 11 is thus shown as supplying power to the load 10 from the preferred source 8.

In the normal condition, then, it will be seen that the independent source 42, which has one terminal grounded, is connected, through closed switch 26–27, to a line 43 which leads to switch 16–18, and from there, through line 44 to the wiper 40a of the limit switch 39.

The wiper 40a is not in engagement with the strip 40 at this time, however, so nothing happens.

Assume now, that a critical fault occurs in preferred source 8. This will cause the closing of switch 16–17. Current from the source 42 will then flow through switch 26–27, line 43, switch 16–17, line 45, switch 23–24, line 46, wiper 41a, strip 41, line 47 and coil 36 to ground.

Coil 36 being thus energized, switch 35 will close, thus energizing motor 12. This will cause the motor 12 to rotate, say clockwise as viewed from the left, and move the blades of the load switch 11 to the right until they connect the emergency source 9 to the load 10.

At the same time, the rotation of the motor will rotate the drum of the limit switch, say clockwise as viewed from the left, until the strip 41 moves downwardly past its wiper 41a. When the wiper is no longer in engagement with strip 41, the circuit to the coil 36 is broken by the limit switch and the motor comes to stop, the switch 35 opening when the coil 36 is no longer energized.

Under the above conditions, the emergency source 9, will feed power to the line circuit until the preferred source is restored to standard or normal condition. When this happens, the line fault sensing relay 15 will cause switch 16–17 to open and switch 16–18 to close. The wiper 40a is now in engagement with strip 40, so current from the source 42 flows from strip 40 through line 48 to coil 38. Coil 38 then closes switch 37 and the motor 12 then rotates counterclockwise, as viewed from the left, the connections to the motor 12 being as indicated, until the limit switch returns to the normal position indicated, with the wiper 40a out of engagement with the strip 40.

Counterclockwise rotation of the motor 12 brings the blades of the load switch 11 back to the position shown, so that the preferred source 8 is again connected to the load 10.

Now, let it be assumed that a different situation exists, namely, that there is a critical fault in the emergency source 9 at the same time that one exists in the preferred source 8. When this condition exists, the motor 12 is not energized and the blades of switch 11 do not move. This is so because the fault in the emergency source 9 is sensed by the line fault sensing relay 22 and the switch 23–24 is opened. Hence no current can flow from switch 16–17 (closed by the fault in source 8) through the line 46 to the limit switch 39, switch 23–24 being connected in series with the switch 16–17.

There is no point in substituting one defective source for another defective source, and, in accordance with the present invention, no such substitution can be made. In other words, the emergency source 9 is tested and found suitable before it is substituted for the preferred source 8, when a fault occurs in source 8.

Again, let it be assumed that still another situation exists. There may be a critical fault in the load circuit 10 at the same time that there is a fault in either source 8 or source 9 or in both sources 8 and 9. Under these conditions, no switching occurs because the fault in the load circuit 10 is sensed by the load fault sensing relay 25 which opens the switch 26–27, and since this switch is also in series with the switch 16–17, neither coil 36 nor coil 38 can be energized.

In the absence of the controls of the present invention, automatic switching systems may cause more damage than necessary when a fault occurs somewhere in the system. By precluding switching when there is no point in it, additional safety factors are provided.

While only one embodiment of the invention has been shown and described herein, it is obvious that various changes can be made without departing from the spirit of the invention or the scope of the annexed claims.

I claim:

1. In an electrical power transmission system having a preferred source, an emergency source, a load circuit, and a load switch actuated by a motor to disconnect the preferred source and connect the emergency source to the load circuit when a critical fault occurs in the preferred source, the combination with said motor of a line fault sensing relay for the preferred source, a line fault sensing relay for the emergency source and a reversing relay, together with a source of current for the relays and the lines necessary to connect the relays to the motor to energize the motor automatically to cause it to move the load switch from its normal position to the emergency position responsive to fault conditions in the preferred source, said line fault sensing relay for the emergency source having a switch arranged to be opened if there is a critical fault in the emergency source, said switch being in series with a switch of the line fault sensing relay of the preferred source, whereby there will be no energizing of the motor, and hence no movement of the load switch, if there is a critical fault in the emergency source at the same time that there is a fault in the preferred source.

2. The system of claim 1 in combination with a load fault sensing relay connected to the load circuit and having a switch arranged to be opened if there is a critical fault in the load circuit, said last mentioned switch also being connected in series with the switch of the line fault sensing relay of the preferred source, whereby there will be no energizing of the motor, and hence no movement of the load switch, if there is a critical fault in either the emergency source or the load circuit at the same time that there is a critical fault in the preferred source.

3. The system of claim 1 in combination with a limit switch for the motor and an additional contact for the switch of the line fault sensing relay of the preferred source, so that said switch has a double throw under the control of said relay, said additional contact and said limit switch being so connected to the reversing relay as to cause the motor to be energized in reverse so that it actuates the load switch to return it to its normal position automatically when the fault in the preferred source is cured.

4. The system of claim 1 in which the preferred source and the emergency source are three-phase sources and in which the line fault sensing relays are connected to their respective sources through transformers the primaries of which are delta-connected and the secondaries of which are Y-connected.

5. In a power transmission system, in combination, a source of electricity and a load circuit connected together, means for disconnecting the source from the load automatically when a fault occurs in the source, and means for preventing such disconnection if there is a fault in the load circuit at the same time there is a fault in said source.

6. In a power transmission system, in combination, a preferred source and an emergency source, either of which is adapted to be connected to a load alternatively, means for switching from the preferred source to the emergency source when a fault occurs in the preferred source, means for preventing such switching if there is a fault in the emergency source at the same time that there is a fault in the preferred source, and means for preventing such switching if there is a fault in the load at the same time that there is a fault in the preferred source.

References Cited by the Examiner
UNITED STATES PATENTS

| | | | |
|---|---|---|---|
| 2,245,342 | 6/1941 | Hoye | 307—64 |
| 2,606,217 | 8/1952 | Raine | 307—64 |
| 2,655,603 | 10/1953 | Callahan | 307—64 |
| 2,861,198 | 11/1958 | Soos | 307—64 |

ORIS L. RADER, *Primary Examiner.*

T. J. MADDEN, *Assistant Examiner.*